(12) United States Patent
De Rico Herrero

(10) Patent No.: US 8,136,863 B2
(45) Date of Patent: Mar. 20, 2012

(54) DISMANTLEABLE VEHICLE SEAT

(75) Inventor: Sergio De Rico Herrero, Guadarrama (ES)

(73) Assignee: Innovations & Safety, S.L. (ES)

( * ) Notice: Subject to any disclaimer, the term of this patent is extended or adjusted under 35 U.S.C. 154(b) by 367 days.

(21) Appl. No.: 12/305,147

(22) PCT Filed: Mar. 9, 2007

(86) PCT No.: PCT/ES2007/000131
§ 371 (c)(1),
(2), (4) Date: Dec. 16, 2008

(87) PCT Pub. No.: WO2007/147908
PCT Pub. Date: Dec. 27, 2007

(65) Prior Publication Data
US 2010/0001545 A1    Jan. 7, 2010

(30) Foreign Application Priority Data

Jun. 16, 2006 (EP) .................................. 06380174

(51) Int. Cl.
*B60N 2/42* (2006.01)
*B60N 2/68* (2006.01)
*A61F 5/058* (2006.01)
*E05D 7/10* (2006.01)

(52) U.S. Cl. ... 296/68.1; 16/254; 296/37.15; 296/65.03; 297/440.15; 297/481

(58) Field of Classification Search .................... 16/254, 16/260, 261, 262, 270; 296/65.03, 68.1, 296/37.15; 297/283.3, 440.15, 440.16, 188.01, 297/188.04, 481, 485
See application file for complete search history.

(56) References Cited

U.S. PATENT DOCUMENTS

| | | | | |
|---|---|---|---|---|
| 2,575,221 A | * | 11/1951 | Hiltman et al. | 297/440.16 |
| 4,261,349 A | * | 4/1981 | Frosch et al. | 602/19 |
| 4,804,226 A | | 2/1989 | Schmale | |
| 5,154,476 A | | 10/1992 | Haider et al. | |
| 5,161,275 A | * | 11/1992 | Simpson et al. | 5/627 |
| 5,183,314 A | * | 2/1993 | Lorbiecki | 297/440.22 |
| 5,269,589 A | * | 12/1993 | Brothers et al. | 297/440.16 |

(Continued)

FOREIGN PATENT DOCUMENTS

DE    19825439 A1    12/1999

(Continued)

OTHER PUBLICATIONS

International Search Report PCT/ES2007/000131; Dated Aug. 6, 2007.

(Continued)

*Primary Examiner* — Glenn Dayoan
*Assistant Examiner* — Paul Chenevert
(74) *Attorney, Agent, or Firm* — Cantor Colburn LLP

(57) ABSTRACT

Detachable vehicle seat, with a back structure and a seat structure, a coupling mechanism for coupling the seat structure to the back structure, a securing mechanism for securing the seat structure to a part of the vehicle floor and a rapid detachment mechanism that permits the seat to be decoupled from the back.

At least one first strap is coupled to the structure of the back part of the seat in a zone corresponding to the abdominal zone of the person.

Also, a headrest in which at least one second strap is coupled in a zone corresponding to the zone of the head of the person.

29 Claims, 14 Drawing Sheets

U.S. PATENT DOCUMENTS

| | | | | |
|---|---|---|---|---|
| 5,443,239 | A | * | 8/1995 | Laporte .................. 248/503.1 |
| 5,803,549 | A | * | 9/1998 | Bolsworth et al. ......... 297/463.1 |
| 5,833,203 | A | * | 11/1998 | Denis et al. .............. 248/503.1 |
| 5,938,286 | A | | 8/1999 | Jones et al. |
| 5,947,515 | A | * | 9/1999 | Fitch ........................... 280/748 |
| 5,947,562 | A | * | 9/1999 | Christofferson et al. 297/440.22 |
| 6,250,713 | B1 | * | 6/2001 | Grohs et al. ................ 297/183.6 |
| 6,254,054 | B1 | * | 7/2001 | Few ........................... 248/503.1 |
| 6,276,365 | B1 | * | 8/2001 | Stelzenmuller ............. 128/869 |
| 6,299,230 | B1 | * | 10/2001 | Oettl ........................ 296/65.03 |
| 6,488,339 | B1 | * | 12/2002 | Finner et al. ............ 297/440.16 |
| 6,550,858 | B1 | * | 4/2003 | Grohs et al. ............... 297/216.1 |
| 6,935,672 | B2 | * | 8/2005 | Dehart ........................ 296/68.1 |
| 6,991,285 | B1 | * | 1/2006 | Hemenway ................... 297/94 |
| 7,387,125 | B2 | * | 6/2008 | Lamon et al. ............... 128/846 |
| 2002/0149253 | A1 | * | 10/2002 | MacDonald ............ 297/452.14 |
| 2010/0019546 | A1 | * | 1/2010 | Stephens ....................... 296/218 |

FOREIGN PATENT DOCUMENTS

| | | | |
|---|---|---|---|
| DE | 19930945 | C1 | 3/2001 |
| DE | 10102109 | | 7/2002 |
| DE | 10112134 | A1 | 9/2002 |
| DE | 10243135 | A1 | 2/2004 |
| DE | 102004014879 | A1 | 10/2005 |
| DE | 102004029866 | A1 | 1/2006 |
| EP | 1084901 | | 3/2001 |
| ES | 2190760 | | 8/2003 |
| GB | 2413782 | A * | 11/2005 |
| WO | 01/17817 | A1 | 3/2001 |
| WO | WO 02/00301 | A1 * | 1/2002 |
| WO | 03057095 | | 7/2003 |

OTHER PUBLICATIONS

Notice of Opposition issued Feb. 22, 2011 by European Patent Office re: European Application No. 07730372.5; citing: DE 10 2004 014 879 A1, EP1 128 981 B1 (equivalent to WO 01/17817 A1), US 5,938,286 A, DE 101 12 134 A1, DE 199 30 945 C1, DE 198 25 439 C2, DE 102 43 135 A1 and De 10 2004 029 866 A1.

* cited by examiner

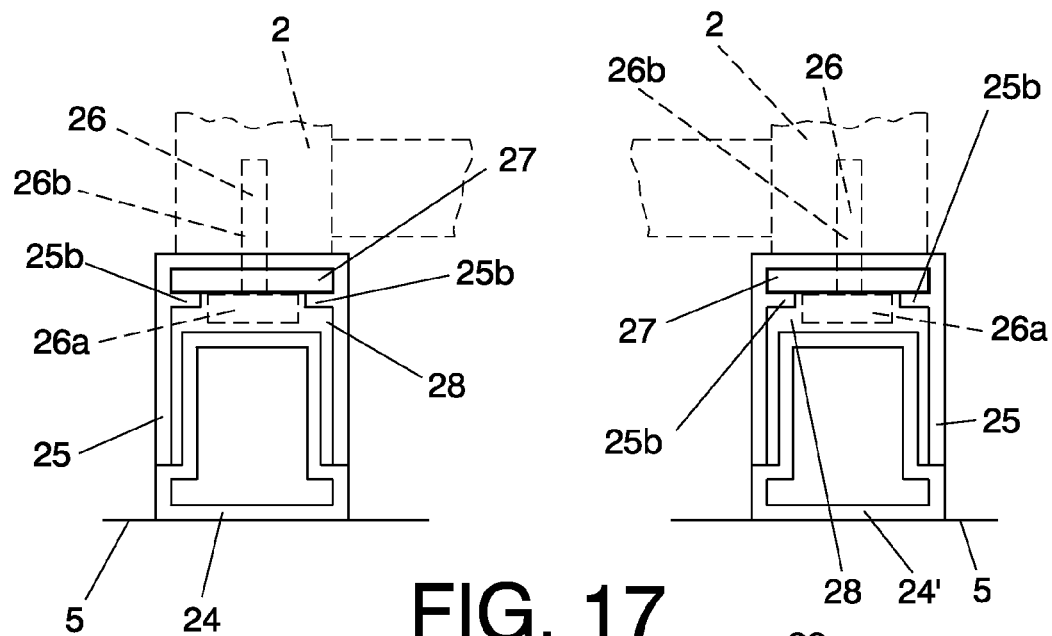
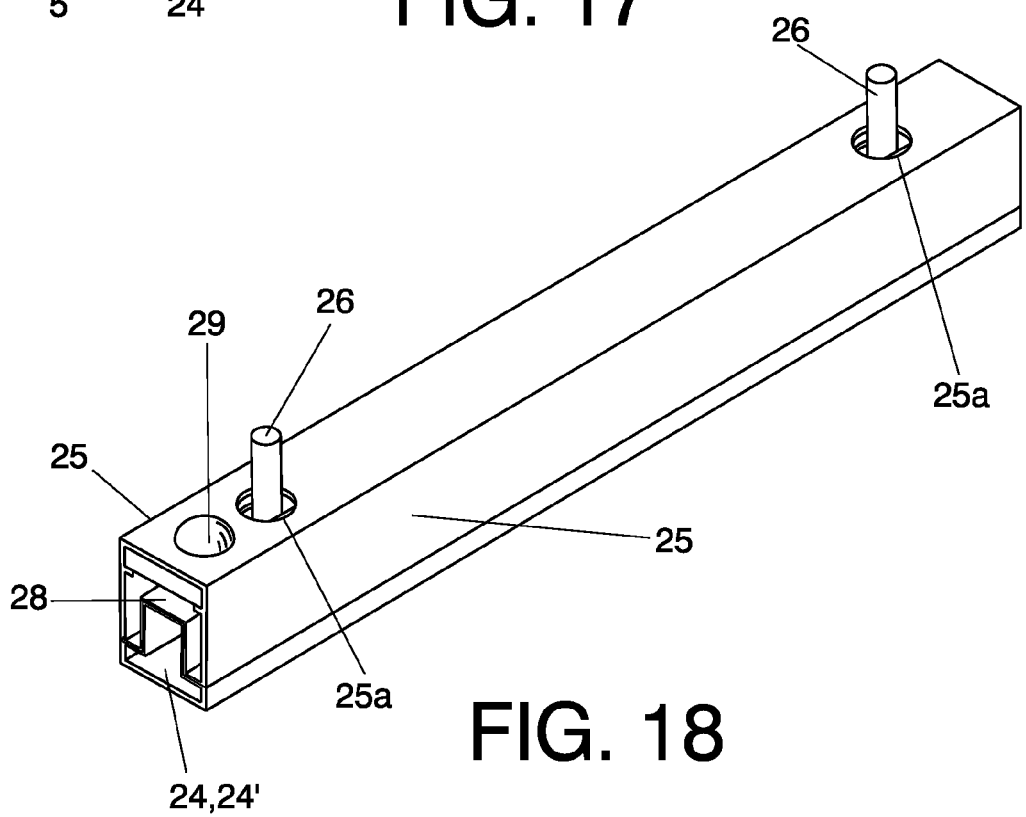

DISMANTLEABLE VEHICLE SEAT

TECHNICAL FIELD OF THE INVENTION

The invention comes within the technical field of seats for vehicles and particularly in the sector of vehicle seats that are at least partially separable from the structure of a vehicle in the event of rescue.

STATE OF THE ART PRIOR TO THE INVENTION

When it comes to rescuing an injured person from a vehicle following a traffic accident, it is very frequently necessary to immobilize the person by keeping the head-neck-column of the person immobilized in order to be able to proceed to his or her extraction or extrication from the vehicle so that they can be taken to the nearest hospital. In order to immobilize the victim there exists specific rescue equipment such as soft collars, extrication jackets, back boards, etc., which are brought and applied by the rescue teams. In theory, this rescue equipment has a series of drawbacks. The first drawback is that the equipment is has to be available at the moment of the rescue, which is not always the case, as for example in situations in which the rescue has to be carried out with considerable urgency, even before the arrival of the recovery teams at the site of the accident, and when, in the case of a multiple accident, the recovery teams do not have sufficient equipment for being applied to all the injured people needing it. Another drawback, especially important when it comes to immobilizing the neck-column axis of the injured person by means of an immobilization board, is that, in order to be able to attach that board to the back of an injured person who is still sitting in his or her seat inside the vehicle, it is usually necessary to move the person away from the back of the seat in order to introduce the board between the back of the injured person and the back of the seat, which, on the one hand, requires moving the person with the danger that this could cause spinal injuries and, on the other, in order to introduce the board between the back of the injured and the back of the seat, it is necessary to have some maneuvering space which is not always available in vehicles that have been involved in accidents, and finally, the application of those boards requires a length of time that in some cases is excessive under the circumstances of the accident or of the person who has to be rescued.

There exist devices that prevent a fair number of the drawbacks mentioned above by means of the inclusion of straps, belts, soft collars, etc., in the seat itself. So, U.S. Pat. No. 5,161,275 describes a lining made of a rigid material attached to the back of the seat. The lining is provided with side elements and straps which permit the driver to be immobilized in the event of an accident, and to extract him or her in the lining for which the lining also includes some gripping handles. U.S. Pat. No. 6,250,713 describes a detachable seat provided with straps, in the upper part of the back of which a soft collar type element can be inserted, and furthermore provided with coupling elements for some slings which can be coupled to a bar, in such a way that, in case of accident, the driver can be extracted immobilized in the seat. In turn, Spanish patent application ES-2190760 describes a device for evacuating an injured person from a seat of a vehicle involved in an accident which includes two telescopic frames with a rod, for support of the back and head of the injured person, whose column-neck-head axis is immobilized by means of a lining with deployable extensions and straps. The device can be combined with or attached to the upholstery of the back of the seat.

The devices mentioned above have the drawback of being uncomfortable for persons under normal driving conditions, and are therefore not suitable for their introduction in vehicles such as cars, trucks, buses, aircraft, etc.

It was therefore desirable to be able to have a system that would enable the back of an injured person sitting in a vehicle seat to be immobilized in case of accident, which in turn would offer a comfort equal to that offered by conventional seats habitually existing in a vehicle, which would permit the extraction of the injured person together with at least the back of the seat in which he or she is immobilized, and which would also be able to be combined into the basic structure of conventional seats without requiring very substantial changes in the basic structure of a conventional seat.

DESCRIPTION OF THE INVENTION

The present invention has the aim of achieving the desirable objectives mentioned above by means of a detachable vehicle seat, which comprises a back structure and a seat structure, means of articulation with at least one articulation shaft, in order to articulate the back structure to the seat structure, coupling means for coupling the seat structure to the back structure and securing means for securing the seat structure to a part of the vehicle floor, this seat also including a rapid detachment mechanism that permits the seat to be decoupled from the back.

In a first embodiment of the seat that includes the rapid detachment mechanism, the coupling means include at least one first left vertical plate attached to a rear part of the left side of the back structure and at least one first right vertical plate attached to a lower part of the right side of the back structure, along with at least one second left vertical plate attached to a rear part of the left side of the seat structure and at least one second right vertical plate attached to a lower part of the right side of the seat structure, the vertical plates presenting separate passage holes. The passage hole in the first left vertical plate and the hole in the second left vertical plate are aligned, and the passage hole in the first right vertical plate and the hole in the second right vertical plate are aligned. The rapid detachment mechanism can comprise rapid detachment means which respectively fix the second left vertical plate and the second right vertical plate to the back structure and/or rapid detachment means which respectively fix the first left vertical plate and the first right vertical plate to the seat structure. The rapid detachment means can be pins, screws threaded into the structure and threaded studs projecting from the structure with nuts.

When, in this first embodiment, the coupling means include two first left vertical plates and two first right vertical plates, the second left vertical plate is arranged between the first left vertical plates and the second right vertical plate between the first right vertical plates. In this case too, the rapid detachment mechanism can comprise rapid detachment means which respectively fix the second left vertical plate and the second right vertical plate to the back structure.

Moreover, when the coupling means include two second vertical plates and two second right vertical plates, the first left vertical plate is arranged between the second left vertical plates and the first right vertical plate between the second right vertical plates. The rapid detachment mechanism comprises rapid detachment means which respectively fix the first left vertical plate and the first right vertical plate to the seat structure.

When the coupling means include a left articulation shaft which traverses the passage holes in the left vertical plates and a right articulation shaft which traverses the passage holes in the right vertical plates, the rapid detachment mechanism can comprise a left catch mechanism applied to one end of the left articulation shaft, and a right catch mechanism applied to one end of the right articulation shaft, or a left pawl mechanism applied to one end of the left articulation shaft, and a right pawl mechanism applied to one end of the right articulation shaft. The rapid detachment mechanism can likewise comprise separate movable bolts which respectively constitute the left articulation shaft and the right articulation shaft, in which case each bolt has a head of diameter much wider than the diameter of the passage holes that it traverses, and a threaded end which is screwed into a securing element such as for example a nut or a block attached to the structure of the seat.

In a second embodiment of the seat that includes the rapid detachment mechanism, the rapid detachment mechanism comprises a left clasping mechanism and a right clasping mechanism. Each clasping mechanism includes an integral part fixed to a structural part selected from between a part of the back structure and a part of the seat structure, which clasps an end part of an articulation shaft, and a movable part coupled to the integral part by movable coupling means. In turn, the integral part clasps at most a half of the perimeter of the articulation shaft. The clasping mechanism can include separate lateral projections on both sides respectively of the integral part and of the movable part, in such a way that the lateral projection of one side of the integral part is in contact with the lateral projection of the movable part. The lateral projections are joined by movable coupling means. The movable part can include a first side articulated to the integral part and a second side, opposite to the first side, in which the movable coupling means are provided. In this embodiment, the movable coupling means can be rapid detachment screws which traverse one of the lateral projections and thread into the other lateral projection and screws which traverse the pairs of lateral projections which are in contact with each other and secured with rapid detachment nuts.

In a third embodiment of the seat that includes the rapid detachment mechanism, the rapid detachment mechanism includes a left articulated body and a right articulated body arranged in such a way that each articulated body clasps an end part of an articulation shaft and includes an integral section fixed to a structural part selected from between a part of the back structure and a part of the seat structure, with the integral section clasping at most a half of the perimeter of the articulation shaft. The articulated body also includes a first tilting part which includes a free end part and an end part articulated to the integral section, opposite to the free end part, and a second tilting part which includes a free end part and an end part articulated to the integral section, opposite to the free end part. In turn, the tilting parts are joined together in the zone of overlap by rapid release means. In this third embodiment, at least the first tilting part can include in its free end a metal strip which is superimposed on the free end part of the second tilting part forming a zone of overlap in which the tilting parts are joined together by rapid release means. In this third embodiment, the rapid release means can include, in the free end parts of the second tilting parts, separate aligned openings in which an immobilizing element is inserted selected from between extractable bolts and rapid detachment screws which traverse one of the tilting parts and which thread into the free end part of the other tilting part. Alternatively, the rapid release means can include, in the free end parts of the second tilting parts, separate tabs which project outwards from said free end parts and which are provided with aligned passage holes in which an immobilizing element is inserted selected from between extractable bolts and rapid detachment screws which traverse one of the tilting parts and which thread into the free end part of the other tilting part.

In a fourth embodiment of the seat that includes the rapid detachment mechanism, the rapid detachment mechanism includes a left articulated bushing and a right articulated bushing. Each articulated bushing clasps an end part of an articulation shaft and includes an integral section fixed to a structural part selected from between a part of the back structure and a part of the seat structure. The integral section clasps at most a half of the perimeter of the articulation shaft. The articulated bushing can also include a first tilting part which includes a free end part and an end part articulated to the integral section, opposite to the free end part, and a second tilting section which includes a free end part and an end part articulated to the integral section, opposite to the free end part. At least the first tilting section includes in its free end a metal strip which is superimposed on the free end part of the second tilting section forming a zone of overlap in which the free end parts of the second sections present separate aligned openings in which an immobilizing element is inserted selected from between extractable bolts and rapid detachment screws which traverse one of the tilting parts and which thread into at least the opening in the free end part of the second tilting section. The metal strip in the first movable section can also be articulated in the first section. In this fourth embodiment, the articulated bushing can furthermore include an additional metal strip, articulated in the free end part of the second movable section, and which overlaps with said strip of the first section.

In a fifth embodiment of the seat that includes the rapid detachment mechanism, the rapid detachment mechanism can include a pyrotechnic device which actuates a guillotine mechanism that acts on a weakened part of the coupling means, or which is inserted in a weakened part of the coupling means.

In another embodiment of the seat, which is also combinable with any of the five embodiments that include the rapid mechanism of the back part, the seat is secured to at least two lower running guides fixed to the floor of the vehicle by means of a rapid release mechanism for the securing of the seat in those lower guides. In this embodiment, the rapid release mechanism can include an upper runner in the form of an inverted U which clasps the sides of the lower runner, and at least two securing bolts, which emerge vertically and beneath the structure of one side of the seat, which have separate widened heads at their free ends and which penetrate through the upper surface of the upper runner via respective holes. A fastening strip is provided inside horizontal axial rails in the interior of the upper runner. In its upper face the fastening strip presents at least two axial grooves, each of which finishes in at least its ends in an insertion hole for one of the securing bolts which has a perimeter greater than the perimeter of the head of the securing bolt. Between the upper surface of the lower runner and the inner surface of the fastening strip there exists an axial space which has a height greater than the height of the heads of the securing bolts. The fastening strip is able to slide between a release position in which the insertion holes are aligned with the holes in the upper runner and a locking position in which the insertion holes are out of alignment with the holes in the upper runner, and the stems of the securing bolts are to be found in the respective axial grooves and the heads of the securing bolts remain retained beneath the fastening strip. Likewise, in this embodiment there exist movable immobilizing means which immobilize the fastening strip in a locking position. These immobilizing means can, for example, be a locking pin inserted in separate passage holes aligned in the upper runner and in the fastening strip.

In yet another embodiment of the invention combinable with any of the previous embodiments described, the seat also includes a system of tying in order to immobilize at least the back of an injured person to the back of the seat. This system of tying includes at least one first strap coupled to the structure of the back part of the seat in a zone corresponding to the abdominal zone of the person and a headrest in which is coupled at least one second strap in a zone corresponding to the head zone of the person. Moreover, the system of tying can include at least one third strap coupled to the structure of the back part of the seat in a zone corresponding to the chest zone of the person and/or a system of fourth straps coupled to the structure of the back part of the seat at the height of the shoulders of the person. This embodiment preferably also includes some compartments with access mouths integrated into the back of the seat and dimensioned for housing the straps when they are not being used. In this case, the seat preferably also includes covers for covering the compartments when the straps are housed in them, and because the covers include means of closure. The covers can be flaps made of the fabric of the seat, in which case the means of closure can be zips provided in the edges of the flaps and in the edges of the fabric surrounding the access mouth of the compartment, or separate Velcro elements arranged in parts of the overlaps and in parts of the fabric in contact with each other.

It can be seen that the present invention satisfactorily achieves the objectives described above.

BRIEF DESCRIPTION OF THE FIGURES

Described below are some embodiments and aspects of the present invention on the basis of some figures, in which

FIG. 17 is a view in rear elevation of an embodiment of some securing means for securing the seat structure to a part of the floor of the vehicle which incorporates an embodiment of some release means applied to the securing;

FIGS. 18 to 22 are views in rear perspective illustrating the various elements making up the securing means shown in FIG. 17;

Figure 1:
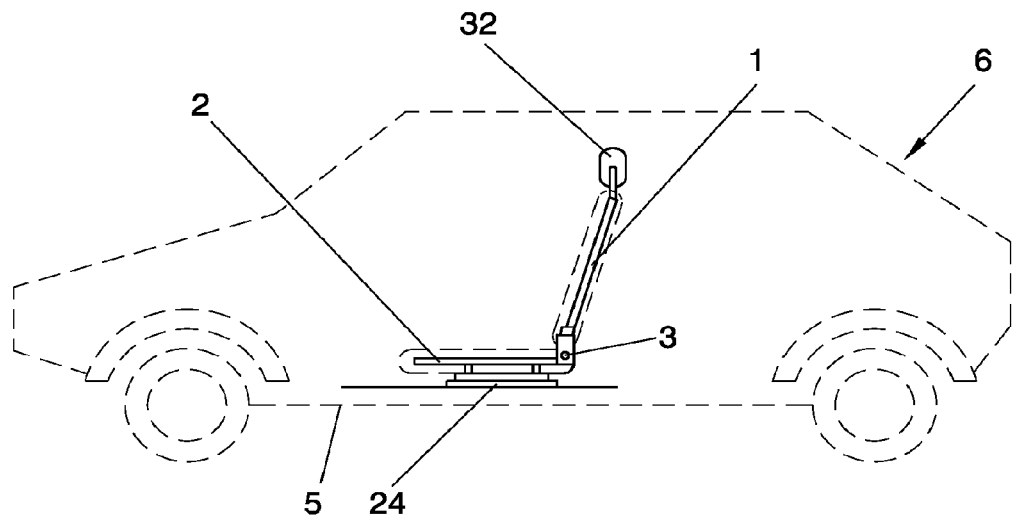
FIG. 1 is a sectioned schematic view in side elevation of a vehicle with a seat.

Appearing in these figures are various elements identified by the following numerical references:
1 back structure
2 seat structure
3 coupling means for coupling the back structure to the seat structure
3a weakened part of the coupling means
4 securing means for securing the back structure to a part of the floor of the vehicle
5 floor of the vehicle
6 vehicle
7a,7c first left vertical plate
7b,7d first right vertical plate
8a,8c second left vertical plate
8b,8d second right vertical plate
9 passing hole
10 rapid detachment means
11 left articulation shaft
11a end of the left articulation shaft
11b bolt head
12 right articulation shaft
12a end of the right articulation shaft
12b bolt head
13 left catch mechanism
13a actuation cable for the left catch mechanism
14 right catch mechanism
14a actuation cable for the right catch mechanism
15 left pawl mechanism
15a actuation cable for the left pawl mechanism
16 right pawl mechanism
16a actuation cable for the right pawl mechanism
17 fixing element
18 left clasping mechanism
18' right clasping mechanism
18a integral part
18b movable part
18c movable coupling means
19 left articulated body
19' right articulated body
19a integral part 19b first tilting part
19c second tilting part
19d metal strip
19e aligned openings
19f tabs
19g passage holes
20 immobilizing element
21 left articulated bushing
21' right articulated bushing
21a integral section
21b first tilting section
21c second tilting section
21d aligned openings
21e additional strip
22 pyrotechnic device
23 guillotine mechanism
24,24' lower runners
25 upper runner
25a holes
26 securing bolts
26a widened heads
26b stems
27 fastening strip
27a axial grooves
27b insertion hole
27c passage holes in the fastening strip
29 locking pin
30 injured person
30a abdominal zone
30b head of the person
30c chest (30c) of the person
30d shoulders of the person
30e pelvis of the person
31 first strap
32 headrest
33 second strap
34 third strap
35 fourth straps
36 fifth straps
37 compartment
37a access mouth
37b cover
38 ring

MODES OF EMBODYING THE INVENTION

Figure 2:
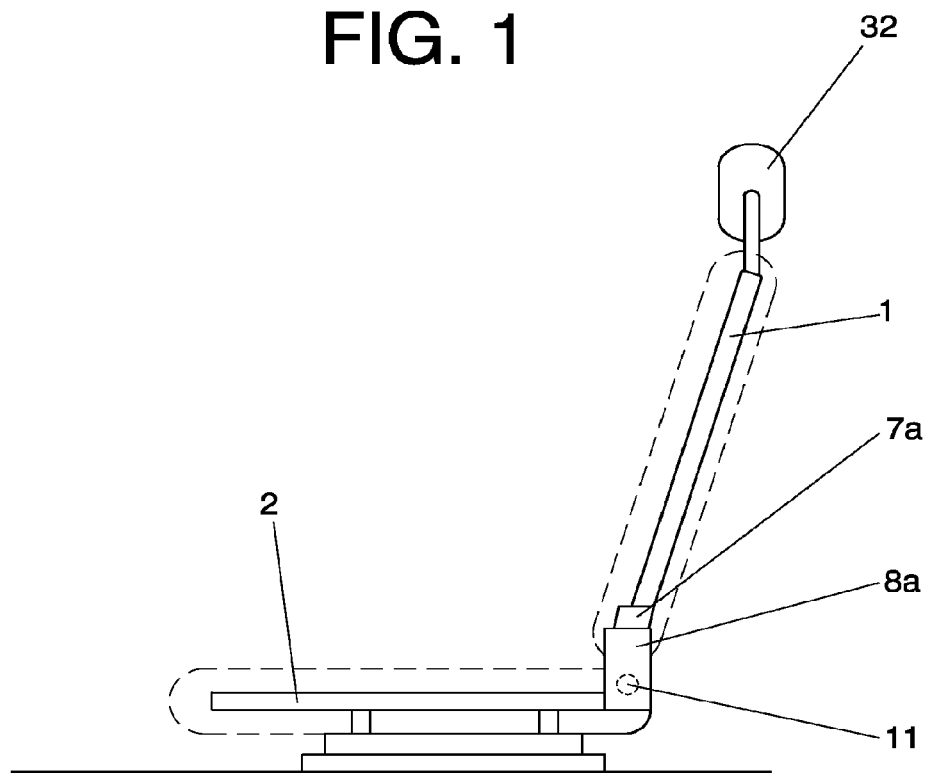
FIG. 2 is a sectioned schematic view in side elevation of the seat.

FIG. 1 shows the usual position of a seat which includes a back structure 1 and a seat structure 2 coupled by means of articulation 3 in a part of the floor 5 of a vehicle. Coupled in the upper part of the back structure, in a way that is in itself conventional, is a headrest 32. As shown in FIG. 2, it can be seen that the back structure 1 is articulated to the seat structure 2 in an articulation shaft 11, which traverses a first vertical plate 7a attached to the back structure 1 and a second vertical plate 8a attached to the seat structure 2.

Figure 3:
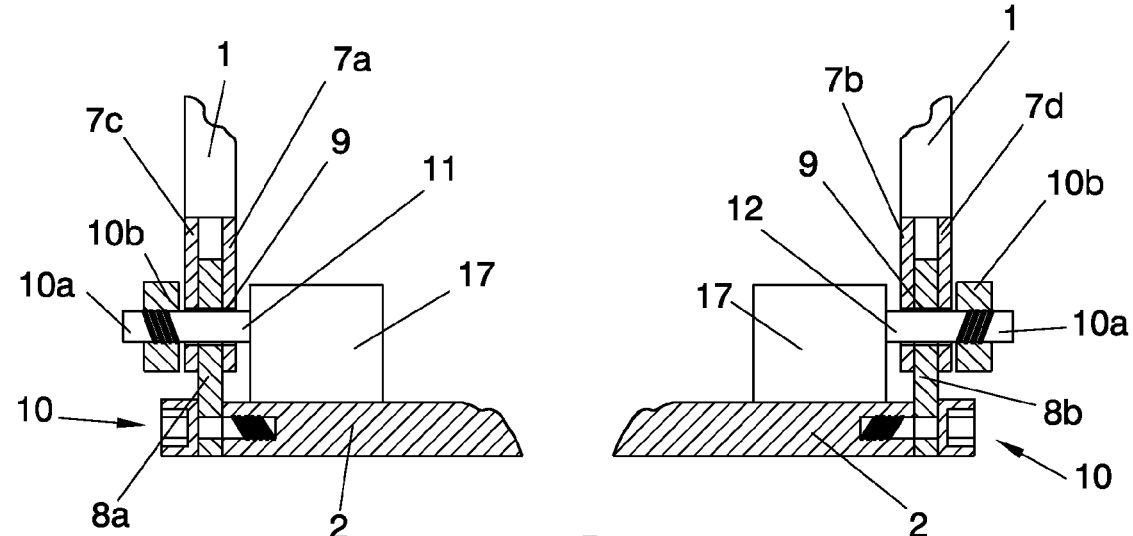
FIG. 3 is a schematic view in rear cross-section of a first practical embodiment of a rapid detachment mechanism of the seat of a vehicle.

In the embodiment shown in FIG. 3, the coupling means include two left vertical plates 7a,7c and two right vertical plate 7b,7d, a second left vertical plate 8a arranged between the first left vertical plates 7a,7c and a second right vertical plate 8b arranged between the first right vertical plates 7b,7d. The vertical plates present aligned passage holes 9. A left articulation shaft 11 traverses the passage holes 9 in the left vertical plates 7a,7c,8a and a right articulation shaft 12 traverses the passage holes 9 in the right vertical plates 7b,7d, 8b, the back structure 1 thus being articulated to the seat structure 2. The shafts 11,12 are separate studs 10b projecting from a structural element 17 of the back structure, with threaded ends into which screw the rapid release nuts 10b. In the embodiment shown in FIG. 3, provision is also made for another rapid detachment mechanism which comprises rapid detachment means 10 in the form of respective screws which thread into the back structure in such a way that they respectively fix the second left vertical plate 8a and the second right vertical plate 8b to the back structure 1.

Figure 4:
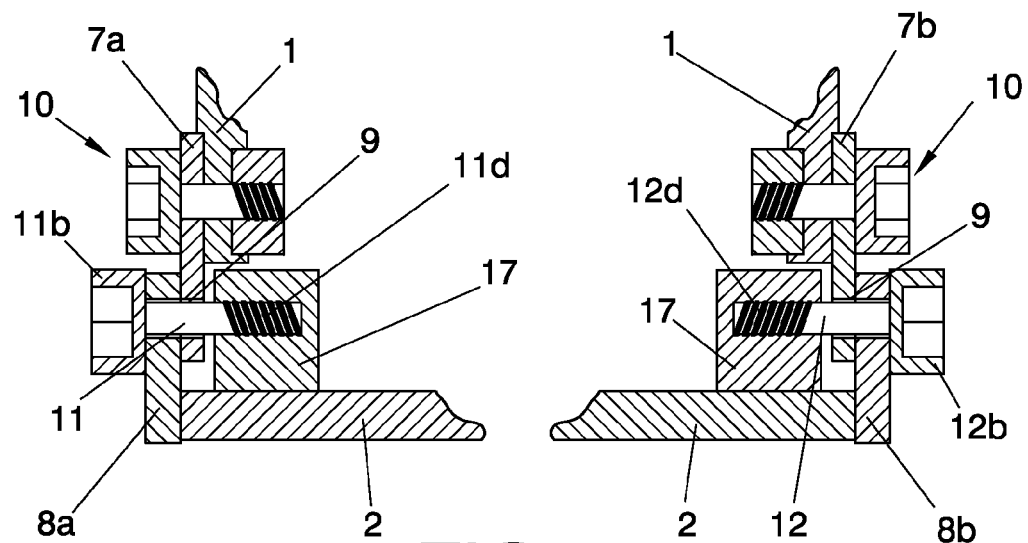
FIG. 4 is a schematic view in rear cross-section of a second practical embodiment of a rapid detachment mechanism of the seat of a vehicle.

In the embodiment shown in FIG. 4, the left articulation shaft 11 and the right articulation shaft 12 are separate movable bolts. It can be seen that each bolt 11,12 includes a head 11b,12b of diameter wider than the diameter of the passage holes 9 which it traverses, and a threaded end 11c,12d which screws into a fixing element 17. In this embodiment too, provision has also been made for another rapid detachment mechanism which comprises rapid detachment means 10 in the form of respective screws which thread into the back structure 1 in such a way that they respectively fix the second left vertical plate 8a and the second right vertical plate 8b to the seat structure 2.

Figure 5:
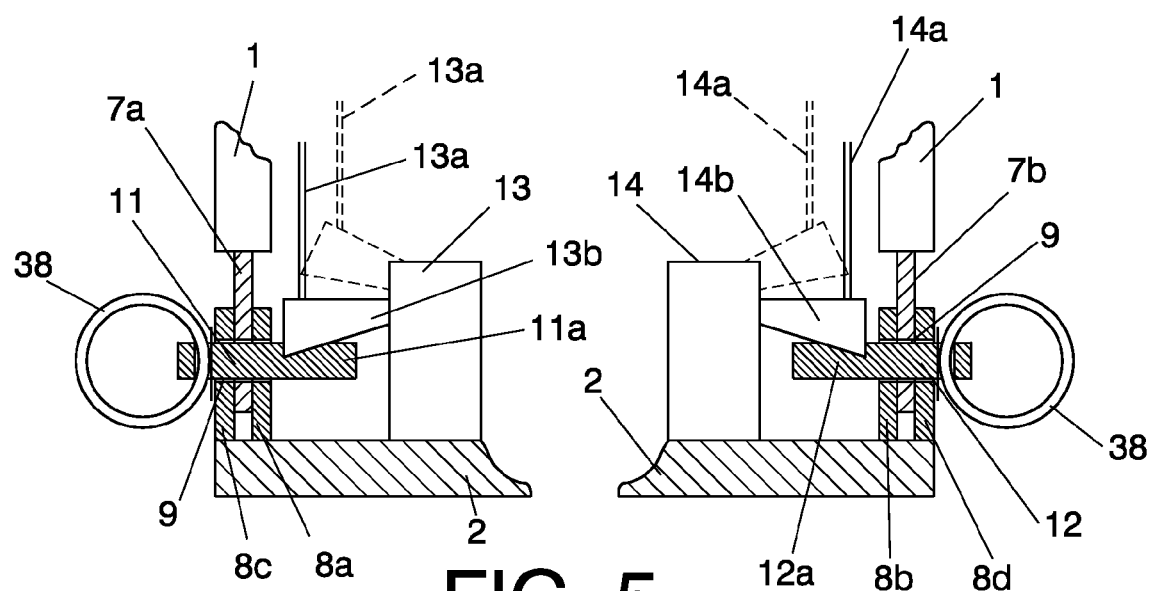
FIG. 5 is a schematic view in rear cross-section of a third practical embodiment of a rapid detachment mechanism of the seat of a vehicle.

In the embodiment shown in FIG. 5, the coupling means of the back structure 1 to the seat structure 2 comprise a left articulation shaft 11 in the form of a stud which traverses the passage holes 9 in the left vertical plates 7a,8a,8c and a right articulation shaft 12, also in the form of a stud, which traverses the passage holes 9 in the right vertical plates 7b,8b, 8d. The rapid detachment mechanism comprises a left catch mechanism 13 applied to the free end 11a of the left stud 11, and a right catch mechanism 14 applied to the free end 12a of the right stud 12. The catch mechanisms 13,14 are actuated by means of respective cables 13a,14a which project from the back of the seat and are connected to some stay elements (not shown in FIG. 5). When the cables 13a,14a are pulled, the catches 13b,14b rise up to the position shown with the line of dashes and exit from a peripheral retention recess for the respective studs 11,12 in such a way that the studs 11,12 can be extracted from the passage holes 9 by pulling the respective rings 38, with the back structure 1 becoming decoupled from the seat structure 2.

Figure 6:
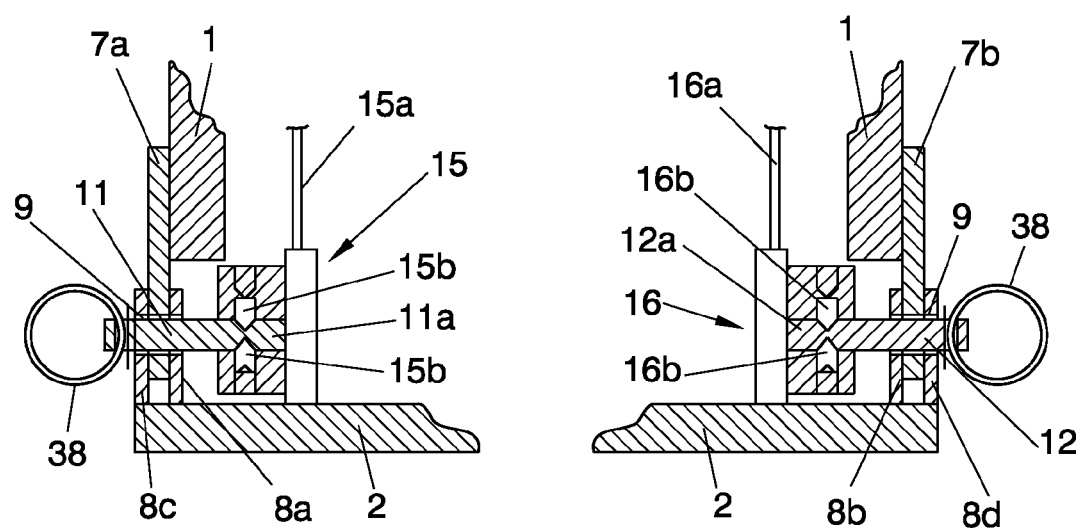
FIG. 6 is a schematic view in rear cross-section of a fourth practical embodiment of a rapid detachment mechanism of the seat of a vehicle.

In the embodiment shown in FIG. 6, the coupling means of the back structure 1 to the seat structure 2 also comprise a left articulation shaft 11 in the form of a stud which traverses the passage holes 9 in the left vertical plates 7a,8a,8c and a right articulation shaft 12, also in the form of a stud, which traverses the passage holes 9 in the right vertical plates 7b,8b, 8d. The rapid detachment mechanism comprises a left pawl mechanism 15 applied to the free end 11a of the left stud 11, and a right pawl mechanism 16 applied to the free end 12a of the right stud 12. The pawl mechanisms 15,16 are actuated by means of respective cables 15a,16a which project from the back of the seat and are connected to some stay elements (not shown in FIG. 6). When the cables 15a,16a are pulled, the pawls 15b,16b rise up to the position shown with the line of dashes and exit from a peripheral retention groove for the respective studs 11,12 in such a way that the studs 11,12 can be extracted from the passage holes 9 by pulling the respective rings 38, with the back structure 1 becoming decoupled from the seat structure 2.

Figure 7:
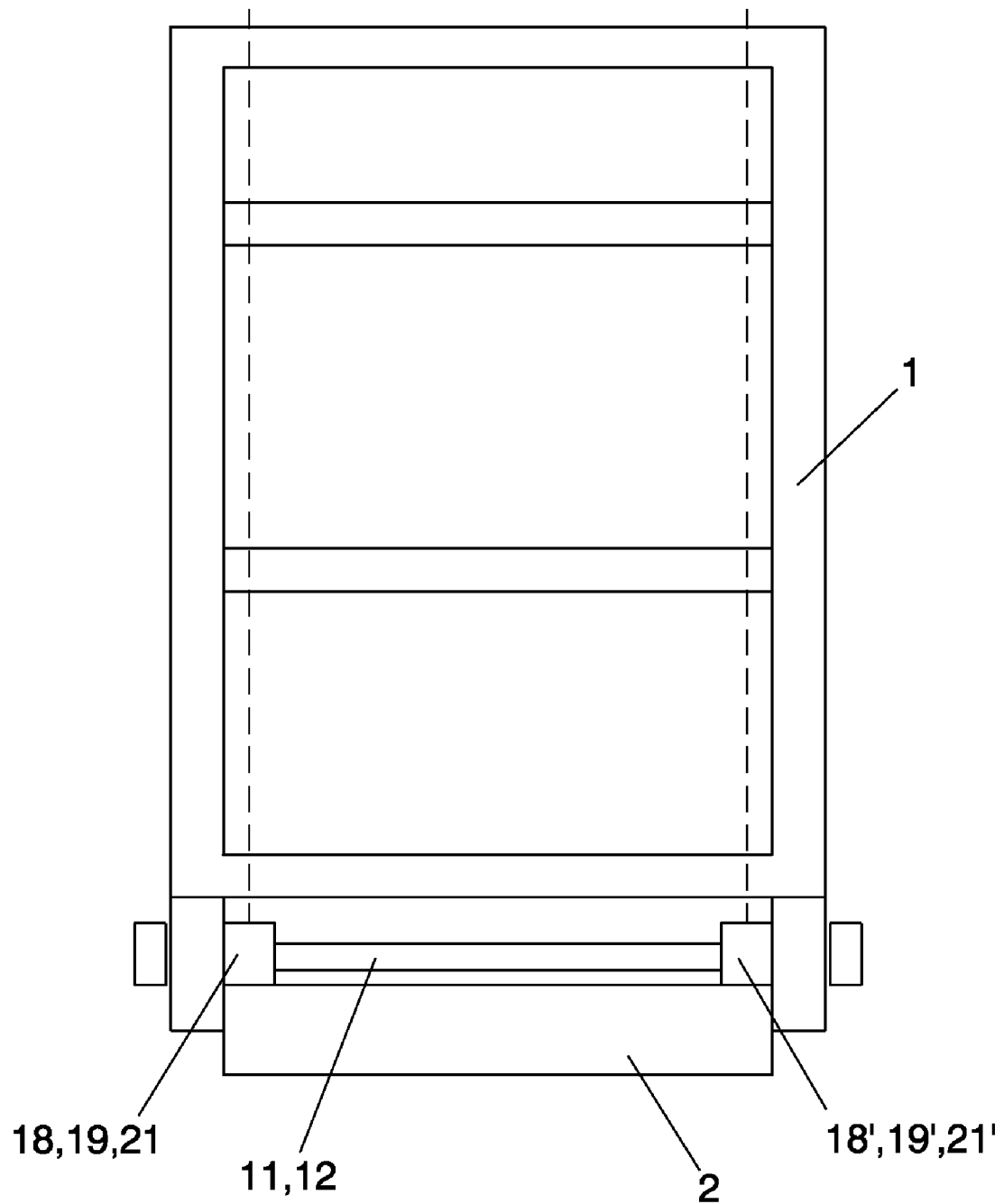
FIG. 7 is a sectioned schematic view in rear elevation of the back and seat structures of a vehicle with a seat that incorporates a fifth practical embodiment of a rapid detachment mechanism.

FIG. 7 shows a later embodiment in which the back part 1 is articulated to the seat part 2 by means of an articulation shaft 11,12, which is clasped by left 18,19,21 and right 18', 19',21' rapid detachment mechanisms which will be described in further detail on the basis of FIGS. 8 to 14.

Figure 8:
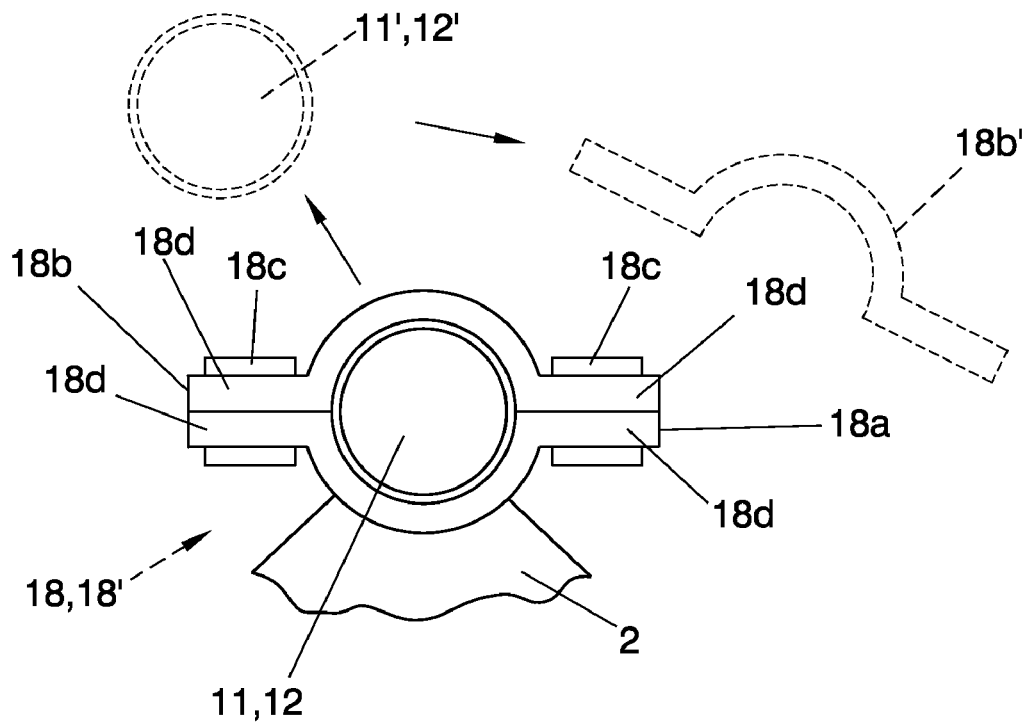
FIG. 8 is a lateral view of a clasping element applicable in the embodiment of FIG. 7.

In the embodiment shown in FIG. 8, the rapid detachment mechanism comprises a left clasping mechanism 18 and a right clasping mechanism 18'. Each clasping mechanism 18,18' clasps the articulation shaft 11,12 and includes an integral part 18a fixed to the seat structure 2, along with a movable part 18b coupled to the integral part 18a by movable coupling means 18c. The integral part 18a clasps less than half of the perimeter of the articulation shaft 11,12. Both sides of the integral part 18a and of the movable part 18b are extended in separate lateral projections 18*d* in such a way that on each side the lateral projection 18*d* of one side of the integral part 18*a* makes contact with the lateral projection 18*d* of the movable part 18*b* and the lateral projections 18*d* are joined by movable coupling means 18*c* which can be, for example, rapid detachment screws which traverse one of the lateral projections 18*d* and thread into the lateral projection 18*d* with which it is in contact, or screws which traverse the pairs of lateral projections 18*d* which are in contact with each other and secured with rapid detachment nuts.

When the coupling means 18*c* are released, the movable part 18*b* can be moved to a distant position 18*b'* in such a way that the shaft 11,12 can be extracted towards the position 11',12' together with the back structure.

Figure 9:
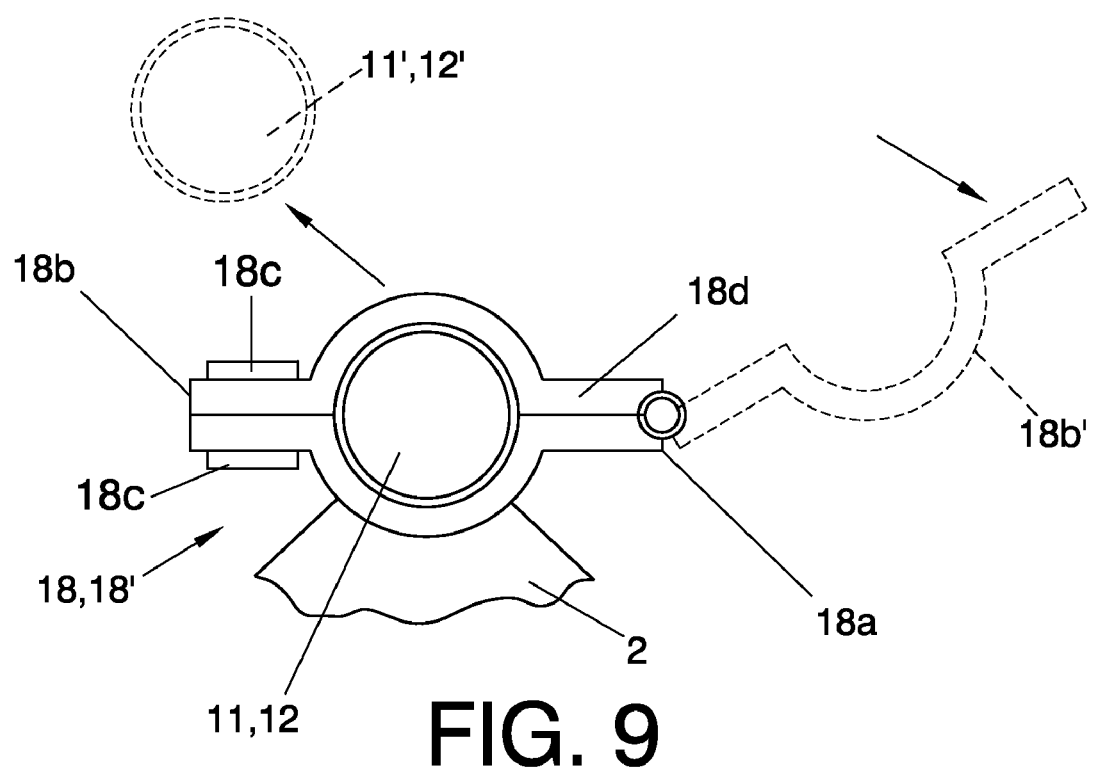
FIG. 9 is a lateral view of another clasping element applicable in the embodiment of FIG. 7.

In the embodiment shown in FIG. 9, the movable part 18*b* includes a first side articulated to the integral part 18*a* and a second side, opposite to the first side, in which the movable coupling means 18*c* are provided which, as in the embodiment of FIG. 8, can be a rapid detachment screw which traverses one of the lateral projections 18*d* and threads into the lateral projection 18*d* or a screw which traverses the pairs of lateral projections 18*d* and is secured with rapid detachment nuts. In this embodiment, when the coupling means 18*c* are released the movable part 18*b* can tilt to the open position 18*b'* in such a way that the shaft 11,12 can be extracted towards the position 11',12' together with the back structure.

Figure 10:
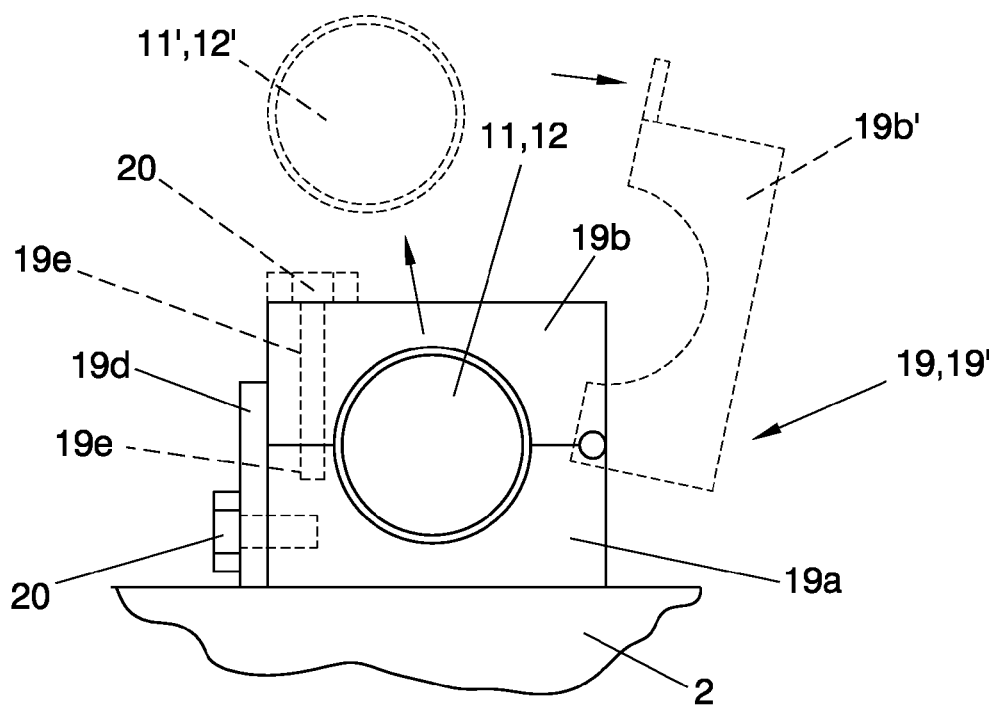
FIG. 10 is a lateral view of an articulated element applicable in the embodiment of FIG. 7.

In the embodiment shown in FIG. 10, the rapid detachment mechanism includes a left articulated body 19 and a right articulated body 19'. Each articulated body 19,19' clasps the articulation shaft 11,12 and includes an integral part 19*a* fixed to the seat structure 2, along with a movable part 19*b* coupled to the integral part 19*a* by movable coupling means 20 for rapid release. The integral part 19*a* clasps less than half of the perimeter of the articulation shaft 11,12. Provided on one side of the movable part 19*b* is a metal strip 19*d* which makes contact with the side of the integral part 19*a*. The movable coupling means 20 for rapid release can, for example, be a rapid detachment screw which traverses the strip 19*d* and threads into the integral part 19*a* or, as shown with the line of dashes in FIG. 10, a rapid detachment screw which traverses the movable part 19*b* and threads into the integral part 19*a* in separate aligned openings 19*e*.

On the opposite side the parts 19*a*,19*b* are articulated in a tilting shaft in such a way that, when the coupling means 20 are released, the movable part 19*b* can tilt to an open position 19*b'* so that the shaft 11,12 can be extracted towards the position 11',12' together with the back structure.

Figure 11:
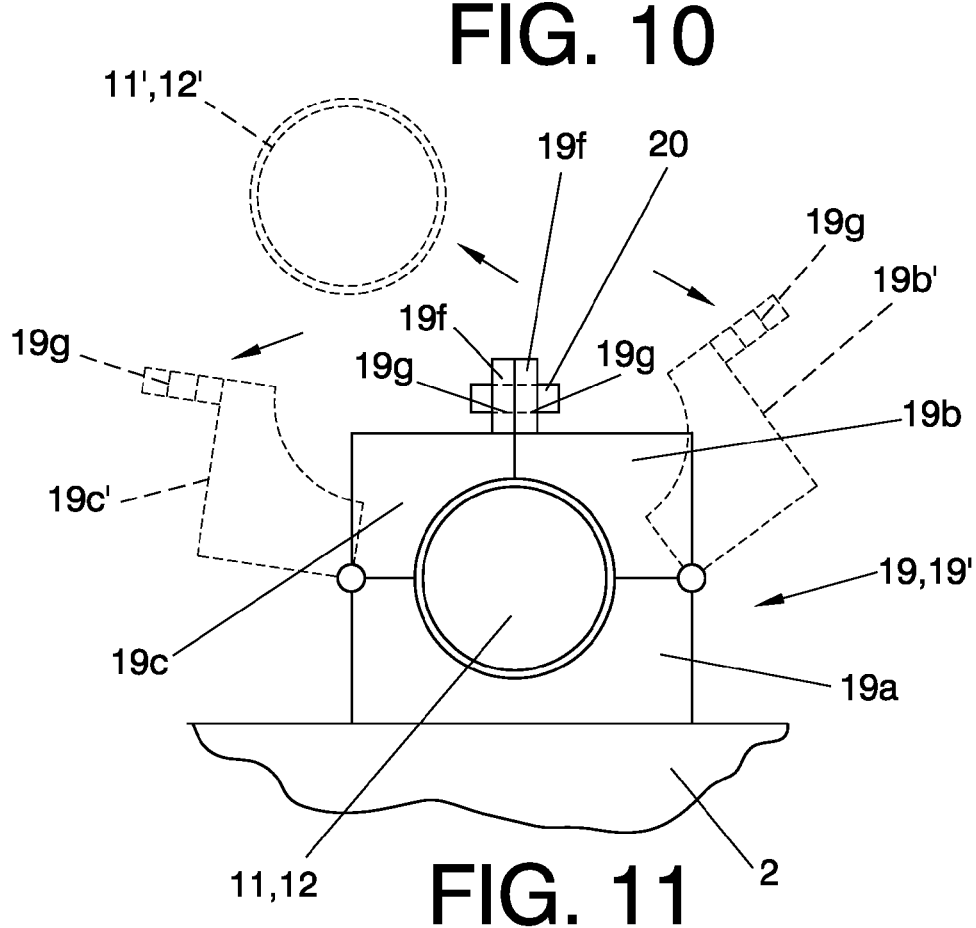
FIG. 11 is a lateral view of another articulated element applicable in the embodiment of FIG. 7.

In the embodiment shown in FIG. 11, the rapid detachment mechanism includes an articulated body 19,19' which also includes a first tilting part 19*b* which includes a free end part and an end part articulated to the integral section 19*a*, opposite to the free end part, and a second tilting part 19*c* which includes a free end part and an end part articulated to the integral section 19*a*, opposite to the free end part. The tilting parts 19*b*,19*c* are joined together in the zone of overlap by rapid release means which include, in the free end parts of the tilting parts 19*b*,19*c*, separate tabs 19*f* which project outwards from said free end parts and which are provided with aligned passage holes 19*g* in which an immobilizing element 20 is inserted selected from between extractable bolts and rapid detachment screws provided in said passage holes 19*g*.

Figure 12:
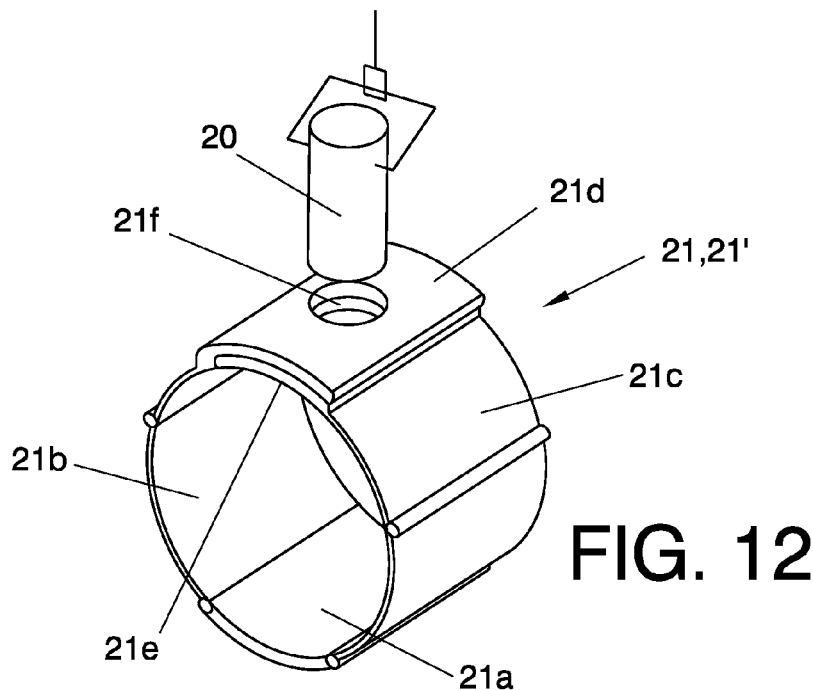
FIG. 12 is a view in lateral perspective of an articulated bushing applicable in the embodiment of FIG. 7.
Figure 13:
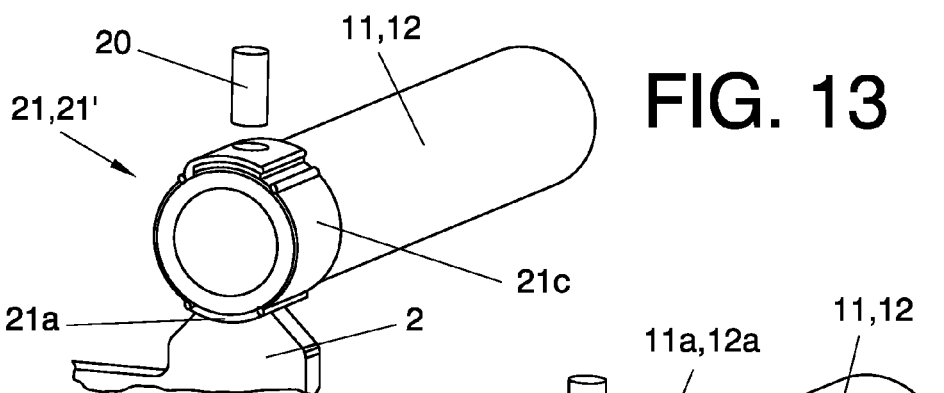
FIG. 13 is a view in lateral perspective of the articulated bushing of FIG. 12 applied to the shaft that articulates the back structure to the seat structure.
Figure 14:
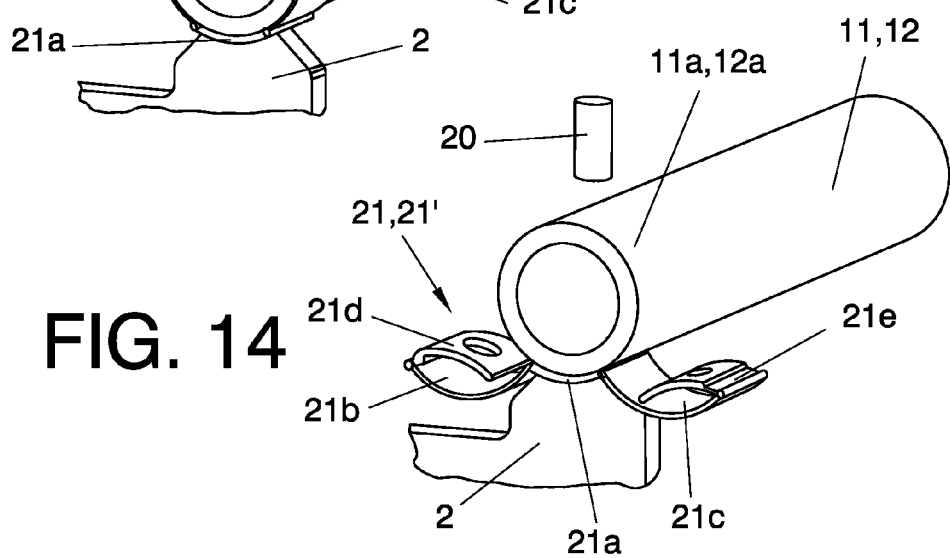
FIG. 14 shows the articulated bushing of FIG. 13 in the state of release from the articulation shaft.

In the embodiment shown in FIGS. 12 to 14, the rapid detachment mechanism includes a left articulated bushing 21 and a right articulated bushing 21'. Each articulated bushing 21,21' clasps an end part 11*a*,12*a* of an articulation shaft 11,12 and includes an integral section 21*a* fixed to a part of the seat structure 2. In this embodiment the integral section 21*a* also clasps at most a half of the perimeter of the articulation shaft 11,12. The articulated bushing 21, 21' can also include a first tilting section 21*b* which includes a free end part and an end part articulated to the integral section 21*a*, opposite to the free end part, and a second tilting section 21*c* which includes a free end part and an end part articulated to the integral section 21*a*, opposite to the free end part. The first tilting section 21*b* includes in its free end a metal strip 21*d* articulated in the first movable section 21*b* which is superimposed with an additional strip (21*e*) articulated in the free end part of the second movable section 21*c*, in such a way that the additional strip 21*e* overlaps with said strip 21*e* of the first section 21*b*, forming a zone of overlap. In that zone of overlap the strips 21*d*,21*e* present separate aligned openings 21*f* in which an immobilizing element 20 is inserted which in the case of FIGS. 12 to 14 is an extractable bolt.

Figure 15:
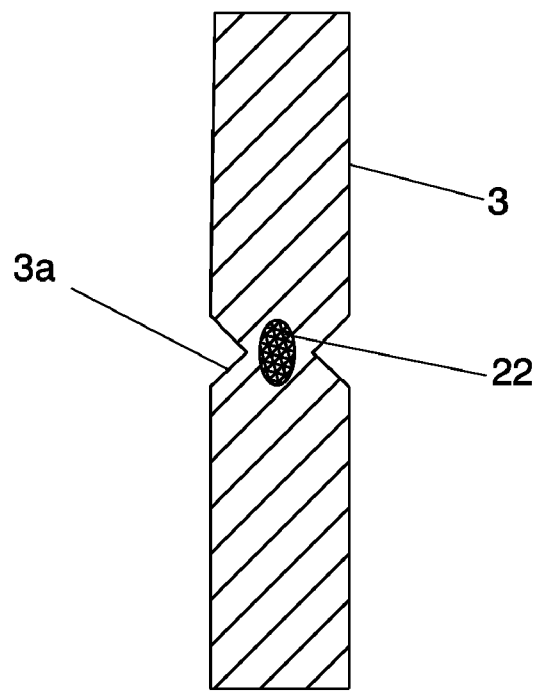
FIG. 15 is a view in lateral cross-section of a vertical strip with a is weakened zone inside which is to be found a pyrotechnic device.

In FIG. 15 can be seen an embodiment of the rapid detachment mechanism in which this comprises a pyrotechnic device 22 inserted in a weakened part 3*a* of the articulation means 3. When the pyrotechnic device 22 explodes it breaks the weakened part 3*a* in such a way that the seat part becomes decoupled from the back part.

Figure 16:
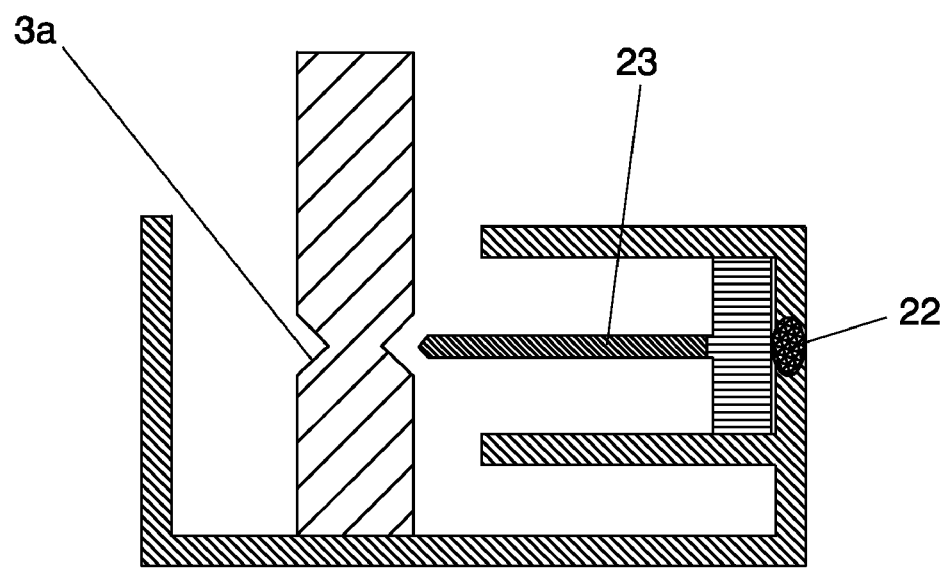
FIG. 16 is a view in lateral cross-section of a vertical strip with a weakened zone and a pyrotechnic device coupled to a guillotine mechanism which is used for sectioning the weakened zone.
Figure 19:
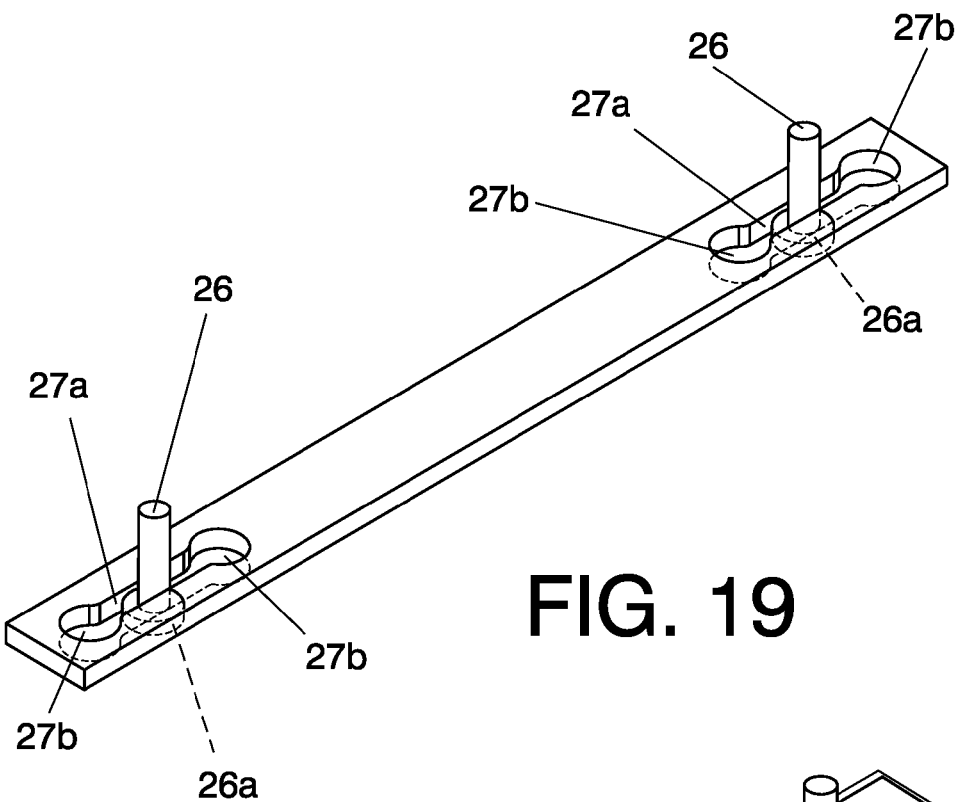
Figure 20:
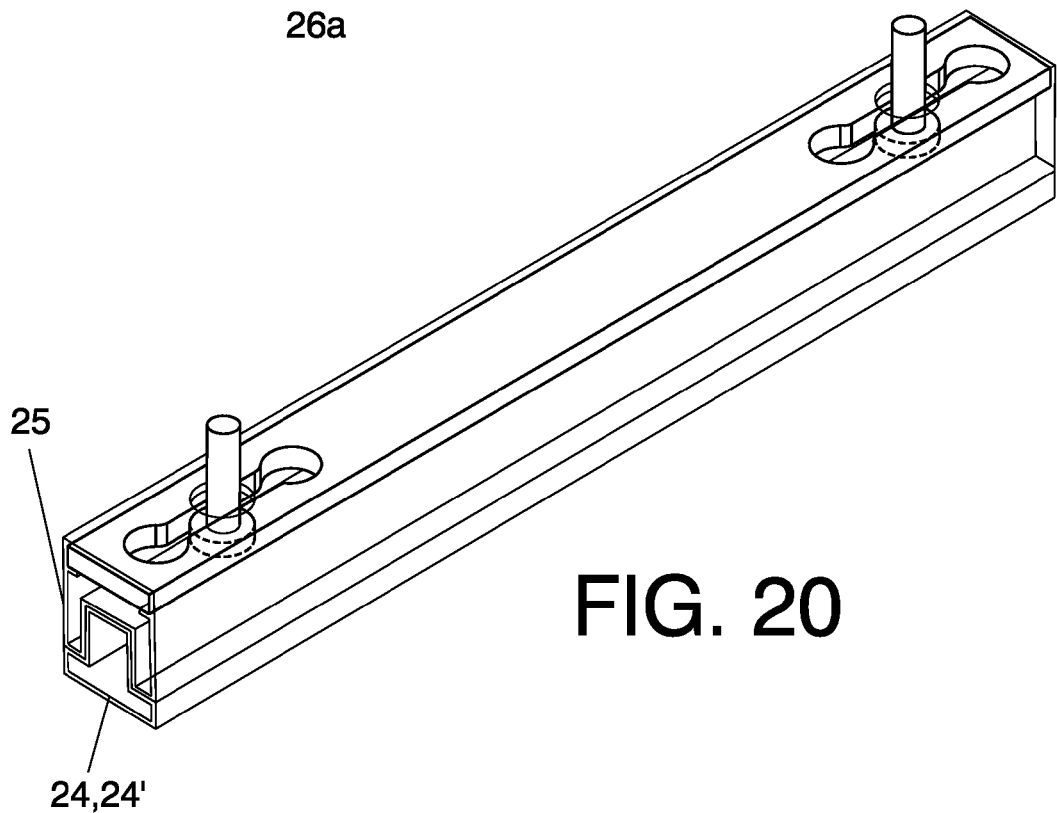
Figure 21:
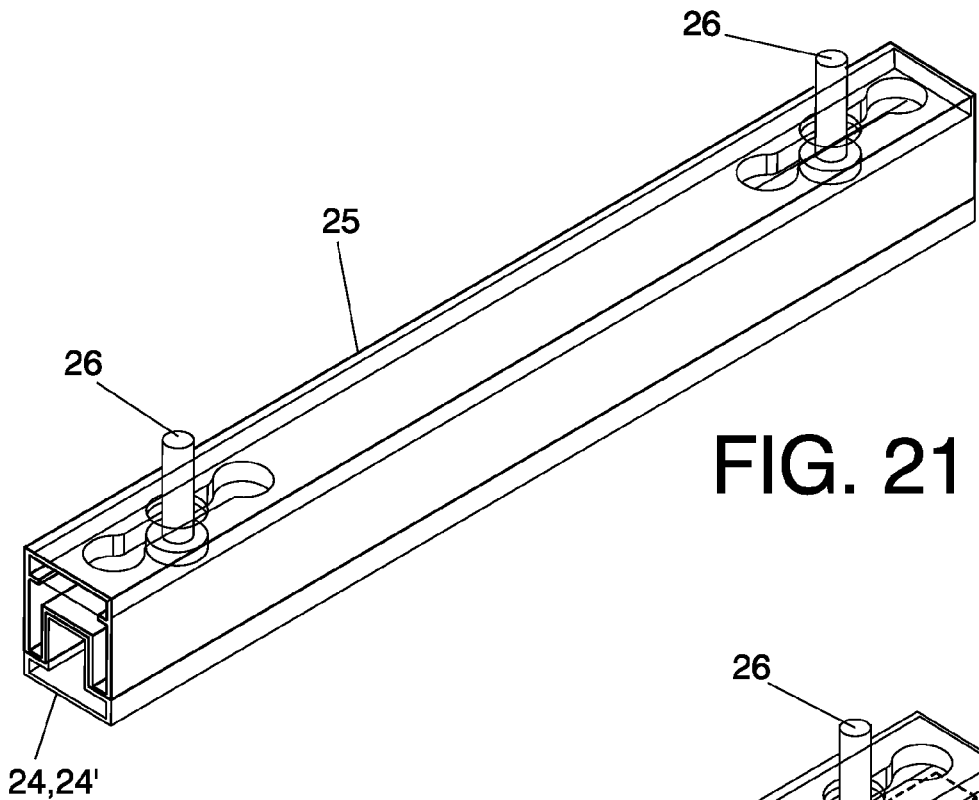
Figure 22:
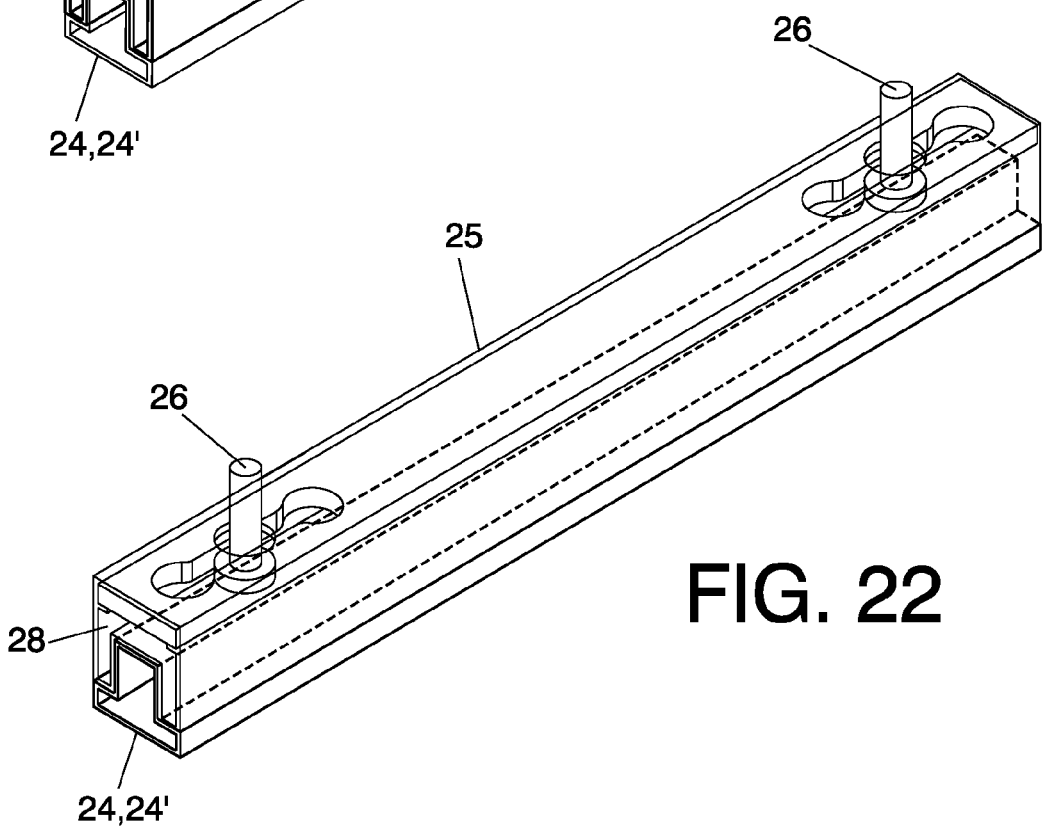

In FIG. 16 can be seen another embodiment of the rapid detachment mechanism in which this comprises a pyrotechnic device 22 which actuates a guillotine mechanism 23 which acts on a weakened part 3*a* of the articulation means 3. When the pyrotechnic device 22 explodes it launches the guillotine device 23 against the weakened part 3*a* which therefore becomes sectioned such that the seat part becomes decoupled from the back part.

FIGS. 17 to 22 show an embodiment of the means of securing in which the seat structure 2 is secured to at least two lower running guides 24,24' fixed to the floor 5 of the vehicle 6 by means of separate rapid release mechanisms for the securing of the seat structure 2 in those lower guides 24,24'. In this embodiment, each rapid release mechanism includes an upper runner 25 in the form of an inverted U which clasps the sides of the lower runner 24, and at least two securing bolts 26, which emerge vertically and beneath the structure of one side of the seat structure 2, which have separate widened heads 26*a* at their free ends and which penetrate through the upper surface of the upper runner 25 via respective holes 25*a*. The rapid release mechanism also includes a fastening strip 27 provided inside in horizontal axial rails 25*b* in the interior of the upper runner 25 and which presents in its upper face at least two axial grooves 27*a*, each of which finishes in at least its ends in an insertion hole 27*b* for a securing bolt 26, said insertion hole 27*b* having a perimeter greater than the perimeter of the head 26*a* of the securing bolt 26. In this embodiment movable immobilizing means are also provided which immobilize the fastening strip 27 in a locking position. Between the upper surface of the lower runner 24 and the inner surface of the fastening strip 27 there exists an axial space 28 which has a height greater than the height of the heads 26*a* of the securing bolts 26.

The fastening strip 27 is able to slide in those axial rails 25*b* between a release position in which the insertion holes 27*b* are aligned with the holes 25*a* in the upper runner 25 and a locking position in which the insertion holes 27*b* are out of alignment with the holes 25*a* in the upper runner 25, and the stems 26*b* of the securing bolts 26 are to be found to the respective axial grooves 27*a* and the heads 26*a* of the securing bolts 26 remain retained beneath the fastening strip 27. The movable immobilizing means are in this case a locking pin 29 inserted in separate passage holes aligned in the upper runner 25 and in the fastening strip 27.

Figure 23:
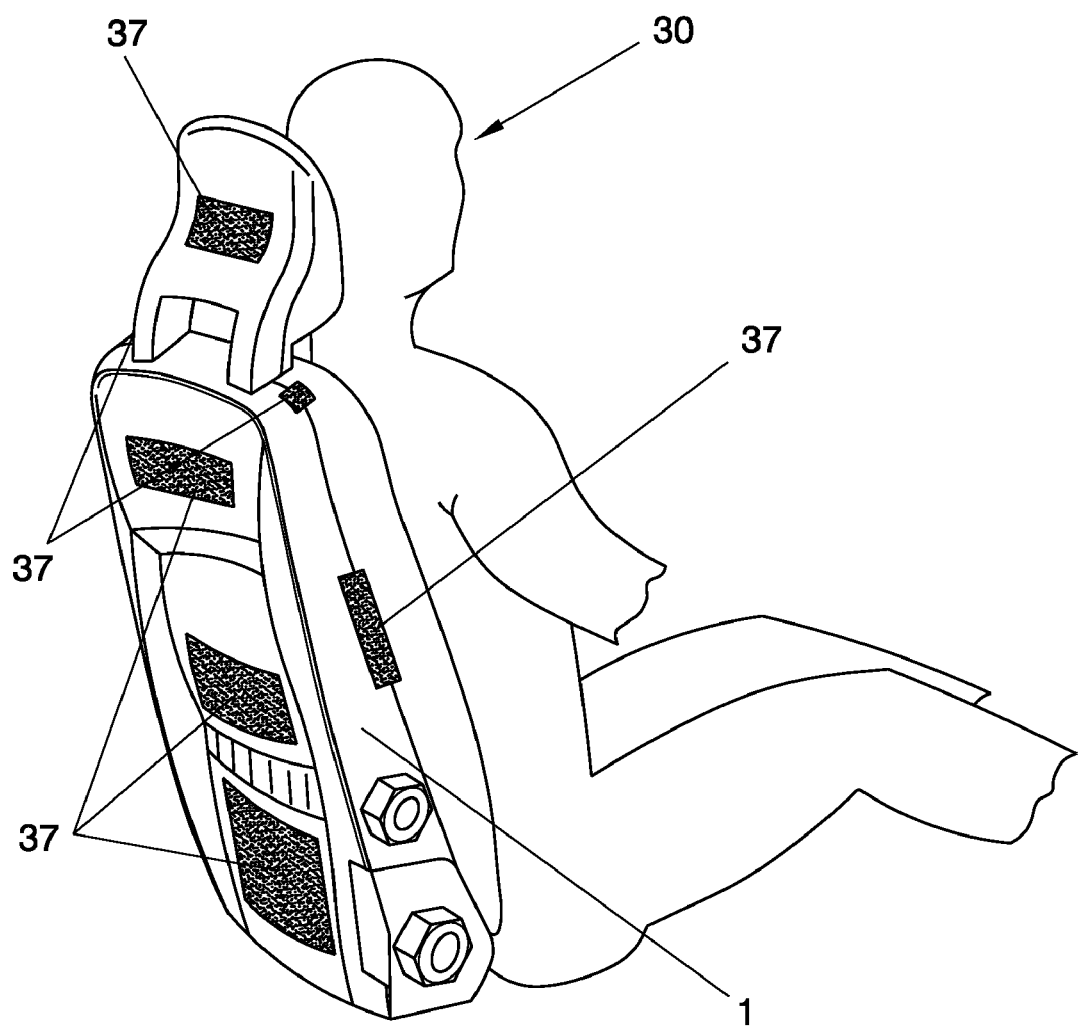
FIG. 23 is a view in rear perspective of a seat that incorporates a system of tying permitting the back of a person to be immobilized.
Figure 24:
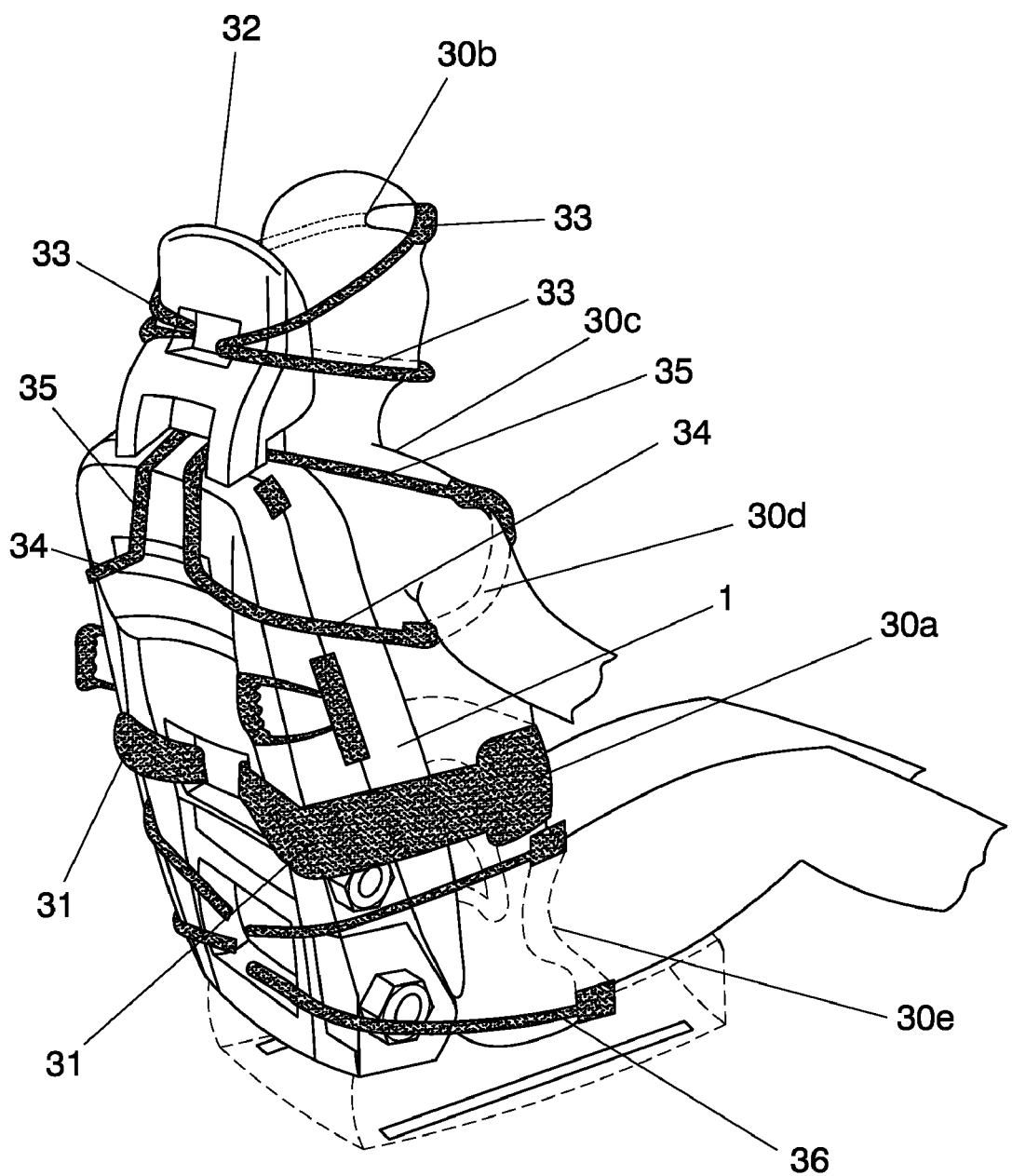
FIG. 24 shows the seat of FIG. 23 with the system of tying applied to the person.
Figure 25:
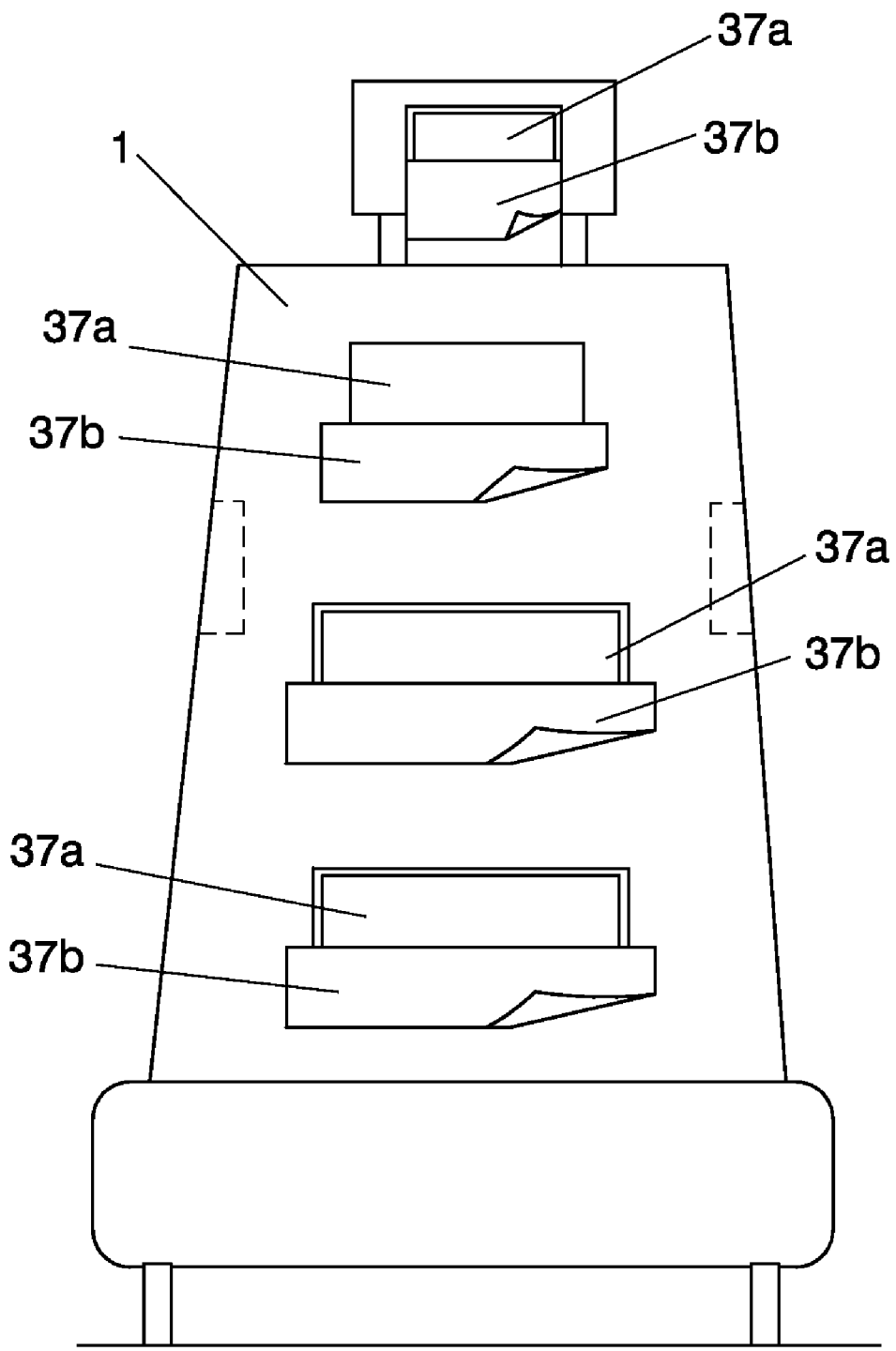
FIG. 25 is a schematic view in rear elevation of an embodiment of the seat that incorporates the system of tying illustrated in FIG. 24.

In FIGS. 23 to 25 an embodiment can be seen of a system of tying which serves to immobilize at least the back of an injured person 30, and which comprises two first straps 31 coupled to the structure of the back part 1 of the seat in a zone corresponding to the abdominal zone 30*a* of the person 30 and a headrest 32 in which is coupled a set of second straps 33 in a zone corresponding to the head zone 30*b* of the person 30.

The system of tying also includes a third strap 34 coupled to the structure of the back part 1 of the seat in a zone corresponding to the chest zone 30c of the person 30 along with a system of fourth straps 35 coupled to the structure of the back part 1 of the seat at the height of the shoulders 30d of the person 30 and a system of fifth straps 36 coupled to the structure of the back part 1 of the seat at the height of the pelvis 30e of the person 30. The seat is provided with compartments 37 with access mouths 37a integrated into the back of the seat and dimensioned for housing the straps 31,33,34, 35,36. These compartments are provided with covers 37b for covering the access mouths 37a of the compartments 37 when the straps 31,33,34,35,36 are housed in them. In the embodiment shown, the covers 37b are flaps made of the fabric of the seat and the means of closure are zips provided in the edges of the flaps and in the edges of the fabric surrounding the access mouth of the compartment. The means of closure can also be hook and loop secure elements, such as VELCRO arranged in parts of the overlaps and in parts of the fabric in contact with each other.

The invention claimed is:

1. Detachable vehicle seat, comprising:
   a back structure;
   a seat structure;
   coupling means for coupling the seat structure to the back structure;
   securing means for securing the seat structure to a part of the floor of the vehicle;
   a rapid detachment mechanism that permits the seat to be decoupled from the back; and
   a system of tying in order to immobilize at least the back of an injured person, which includes:
      at least one first strap coupled to the structure of the back part of the seat in a zone corresponding to the abdominal zone of the person;
      a headrest in which is coupled at least one second strap in a zone corresponding to the head zone of the person,
         wherein said seat further includes compartments with access mouths integrated into the back of the seat and dimensioned for housing the straps.

2. Seat according to claim 1, wherein the seat includes at least one third strap coupled to the structure of the back part of the seat in a zone corresponding to the chest zone of the person.

3. Seat according to claim 1, wherein the seat furthermore includes a system of fourth straps coupled to the structure of the back part of the seat at the height of the shoulders of the person and a system of fifth straps coupled to the structure of the back part of the seat at the height of the pelvis of the person.

4. Seat according to claim 1, wherein the seat structure is secured to at least two lower running guides fixed to the floor of the vehicle by means of separate rapid release mechanisms for the securing of the seat structure in those lower guides.

5. Seat according to claim 4, wherein each rapid detachment mechanism includes
   an upper runner in the form of an inverted U which clasps the sides of the lower runner;
   at least two securing bolts, which emerge vertically and beneath one side of the seat structure, which have separate widened heads at their free ends and which penetrate through the upper surface of the upper runner via respective holes;
   a fastening strip provided inside in horizontal axial rails in the interior of the upper runner, and which presents in its upper face at least two axial grooves, each of which finishes in at least its ends in an insertion hole for a securing bolt, the insertion hole for which has a perimeter greater than the perimeter of the head of the securing bolt;
   movable immobilizing means which immobilize the fastening strip in a locking position;
   an axial space between the upper surface of the lower runner and the lower surface of the fastening strip, which axial space has a height greater than the height of the heads of the securing bolts;
   and in that the fastening strip is able to slide in said axial rails between a release position in which the insertion holes are aligned with the holes in the upper runner and a locking position in which the insertion holes are out of alignment with the holes in the upper runner, and the stems of the securing bolts are to be found in the respective axial grooves and the heads of the securing bolts remain retained beneath the fastening strip.

6. Seat according to claim 5, wherein the immobilizing means comprises a locking pin inserted in separate passage holes aligned in the upper runner and in the fastening strip.

7. Seat according to claim 1, wherein
   the rapid detachment mechanism includes a left articulated bushing and a right articulated bushing;
   each articulated bushing clasps an end part of an articulation shaft and includes an integral section fixed to a structural part selected from between a part of the back structure and a part of the seat structure;
   the integral part clasps at most a half of the perimeter of the articulation shaft;
   the articulated bushing also includes a first tilting section which includes a free end part and an end part articulated to the integral section opposite to the free end part, and a second tilting section which includes a free end part and an end part articulated to the integral section, opposite to the free end part;
   at least the first tilting section includes in its free end a metal strip which is superimposed on the free end part of the second tilting section forming a zone of overlap;
   in the zone of overlap the free end parts of the second sections present separate aligned openings in which an immobilizing element is inserted selected from between extractable bolts and rapid detachment screws which thread into at least the opening in the free end part of the second tilting section.

8. Seat according to claim 7, wherein the metal strip is articulated in the first movable section.

9. Seat according to claim 7, wherein the seat includes an additional metal strip articulated in the free end part of the second movable section and in that the additional metal strip overlaps with said strip of the first section.

10. Seat according to claim 1, wherein the seat includes covers for covering the access mouths of the compartments when the straps are housed in them and in that the covers include means of closure.

11. Seat according to claim 10, wherein the covers are flaps made of the fabric of the seat, and in that the means of closure are zips provided in the edges of the flaps and in the edges of the fabric surrounding the access mouth of the compartment.

12. Seat according to claim 10, wherein the covers are flaps made of the fabric of the seat, and in that the means of closure are separate hook and loop secure elements arranged in parts of the overlaps and in parts of the fabric in contact with each other.

13. Seat according to claim 1, wherein
   the rapid detachment mechanism comprises a left clasping mechanism and a right clasping mechanism;

each clasping mechanism clasps an articulation shaft and includes an integral part fixed to a structural part selected from between a part of the back structure and a part of the seat structure, along with a movable part coupled to the integral part by movable coupling means; and the integral part clasps at most a half of the perimeter of the articulation shaft.

14. Seat according to claim 13, wherein the movable part includes a first side articulated to the integral part and a second side, opposite to the first side, in which the movable coupling means are provided.

15. Seat according to claim 13, wherein the clasping mechanism includes separate lateral projections on both sides respectively of the integral part and of the movable part, the lateral projection of one side of the integral part being in contact with the lateral projection of the movable part and the lateral projections being joined by movable coupling means.

16. Seat according to claim 15, wherein the movable coupling means are selected from between rapid detachment screws which traverse one of the lateral projections and thread into the lateral projection with which they are in contact, and screws which traverse the pairs of lateral projections which are in contact with each other and secured with rapid detachment nuts.

17. Seat according to claim 1, wherein
the rapid detachment mechanism includes a left articulated body and a right articulated body;
each articulated body clasps an end part of an articulation shaft and includes an integral section fixed to a structural part selected from between a part of the back structure and a part of the seat structure;
the integral part clasps at most a half of the perimeter of the articulation shaft;
the articulated body also includes a first tilting part which includes a free end part and an end part articulated to the integral section, opposite to the free end part, and a second tilting part which includes a free end part and an end part articulated to the integral section, opposite to the free end part;
the tilting parts are joined together by rapid release means.

18. Seat according to claim 17, wherein the rapid release means include in the tilting parts separate aligned openings in which an immobilizing element is inserted selected from between extractable bolts and rapid detachment screws which traverse one of the tilting parts and thread into the free end part of the other tilting part.

19. Seat according to claim 17, wherein
at least the first tilting part includes in its free end a metal strip which is superimposed on a side of the second tilting part forming a zone of overlap;
the tilting parts are joined together in the zone of overlap by rapid release means.

20. Seat according to claim 19, wherein the rapid release means include, in the free end parts of the tilting parts, separate tabs which project outwards from said free end parts and which are provided with aligned passage holes in which an immobilizing element is inserted selected from between extractable bolts and rapid detachment screws provided in said passage holes.

21. Seat according to claim 1, wherein
the coupling means include at least one first left vertical plate attached to a rear part of the left side of the back structure and at least one first right vertical plate attached to a lower part of the right side of the back structure, along with at least one second left vertical plate attached to a rear part of the left side of the seat structure and at least one second right vertical plate attached to a lower part of the right side of the seat structure, the vertical plates presenting separate passage holes;
the passage hole in the first left vertical plate and the hole in the second left vertical plate are aligned, and the passage hole in the first right vertical plate and the hole in the second right vertical plate are aligned.

22. Seat according to claim 21, wherein the seat includes two first left vertical plates and two first right vertical plates and in that the second left vertical plate is arranged between the first left vertical plates and the second right vertical plate is arranged between the first right vertical plates.

23. Seat according to claim 21, wherein the seat includes two second left vertical plates and two second right vertical plates and in that the first left vertical plate is arranged between the second left vertical plates and the first right vertical plate is arranged between the second right vertical plates.

24. Seat according to claim 21, wherein the rapid detachment mechanism comprises rapid detachment means which respectively fix the first left vertical plate and the first right vertical plate to the back structure.

25. Seat according to claim 21, wherein
the seat includes a left articulation shaft which traverses the passage holes in the left vertical plates and a right articulation shaft which traverses the passage holes in the right vertical plates;
the rapid detachment mechanism comprises a left catch mechanism applied to one end of the left articulation shaft, and a right catch mechanism applied to one end of the right articulation shaft.

26. Seat according to claim 21, wherein
the seat includes a left articulation shaft which traverses the passage holes in the left vertical plates and a right articulation shaft which traverses the passage holes in the right vertical plates;
the rapid detachment mechanism comprises a left pawl mechanism applied to one end of the left articulation shaft, and a right pawl mechanism applied to one end of the right articulation shaft.

27. Seat according to claim 21, wherein
the seat includes a left articulation shaft which traverses the passage holes in the left vertical plates and a right articulation shaft which traverses the passage holes in the right vertical plates;
the left articulation shaft and the right articulation shaft are separate movable bolts which constitute the rapid detachment mechanism;
each bolt has a head of diameter much wider than the diameter of the passage holes that the seat traverses, and a threaded end which is screwed into a securing element.

28. Seat according to claim 21, wherein the rapid detachment mechanism comprises rapid detachment means which respectively fix the second left vertical plate and the second right vertical plate to the seat structure.

29. Seat according to claim 28, wherein the rapid detachment means are selected from among pins, screws threaded in the structure and threaded studs projecting from the structure with nuts.

* * * * *